W. H. LIEBER.
CONVEYER.
APPLICATION FILED MAR. 25, 1920.
1,433,390.
Patented Oct. 24, 1922.
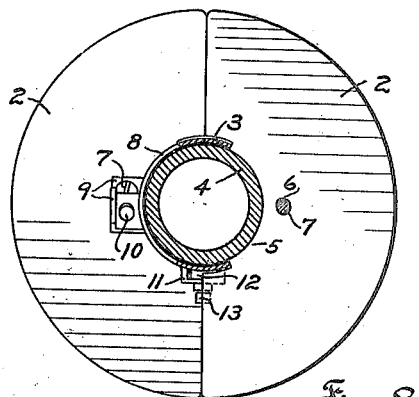
Fig. 2
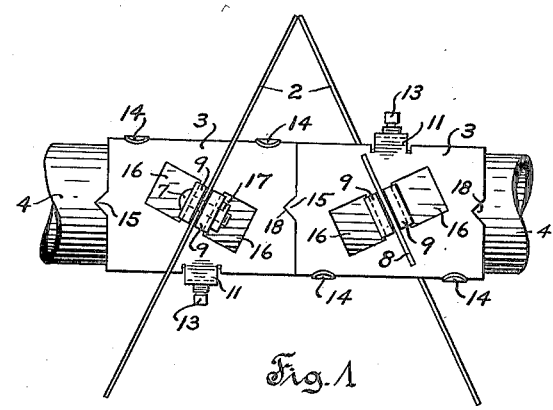
Fig. 1
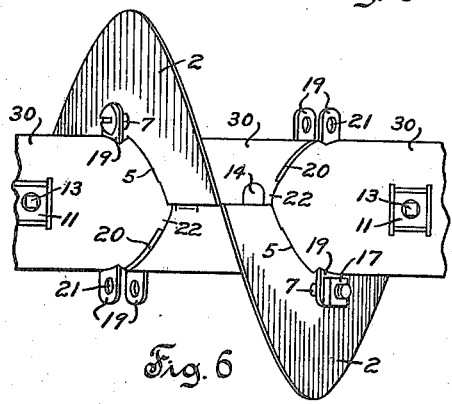
Fig. 6
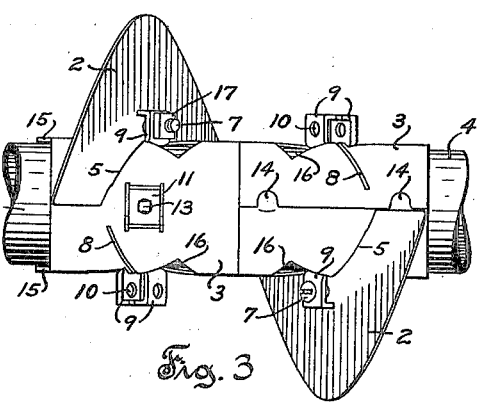
Fig. 3
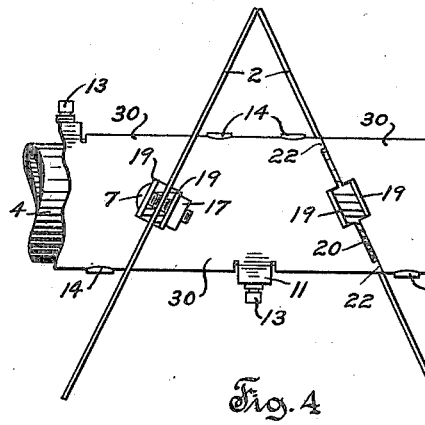
Fig. 4
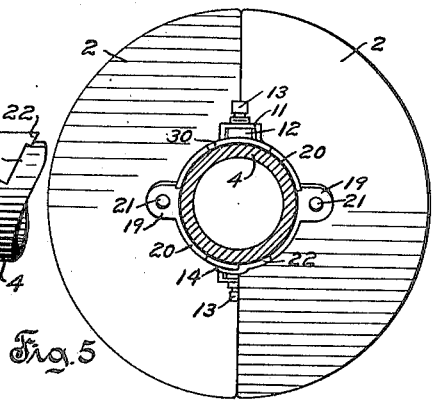
Fig. 5
Inventor
W. H. Lieber
by
Attorney Patented Oct. 24, 1922.

1,433,390

UNITED STATES PATENT OFFICE.

WILLIAM H. LIEBER, OF WEST ALLIS, WISCONSIN, ASSIGNOR TO ALLIS-CHALMERS MANUFACTURING COMPANY, OF MILWAUKEE, WISCONSIN, A CORPORATION OF DELAWARE.

CONVEYER.

Application filed March 25, 1920. Serial No. 369,397.

*To all whom it may concern:*

Be it known that WILLIAM H. LIEBER, a citizen of the United States, residing at West Allis, in the county of Milwaukee and State of Wisconsin, has invented a certain new and useful Improvement in Conveyers, of which the following is a specification.

This invention relates in general to improvements in the construction of screw conveyers of the type comprising a central rotary member and a substantially helical flight secured to the member and adapted to transport granular or pulverulent material along a stationary conduit or trough.

An object of the invention is to provide a screw conveyer which is simple in construction and efficient in operation. Another object is to provide a screw conveyer the transporting flight of which is formed in sections which are reversible in order to reverse the direction of transportation of the material being conveyed. A further object is to provide means for facilitating manufacture of screw conveyers formed of sheet metal. Still another object is to provide a screw conveyer in which the successive sections are of identical formation, thus making the various similar parts interchangeable. Another object is to provide simple and efficient means for locking the flight sections of a screw conveyer to the central drive element thereof. These and other objects of the invention and the manner in which they are attained, will be apparent from the following description:

A clear conception of several embodiments of the invention may be had by referring to the drawing accompanying and forming a part of this specification, in which like reference characters designate the same or similar parts in the various views.

Fig. 1 is a side elevation of several successive sections of a screw conveyer showing the flight sections detachably associated with the central driving element of the conveyer.

Fig. 2 is a transverse section through the conveyer disclosed in Fig. 1, the section being taken directly adjacent to one of the conveyer blades.

Fig. 3 is a bottom view of the conveyer disclosed in Figs. 1 and 2.

Fig. 4 is a side elevation of another form of sectional screw conveyer, showing several successive sections thereof each of which has a flight section detachably associated with its central driving element.

Fig. 5 is an end view of the conveyer shown in Fig. 4.

Fig. 6 is a top view of the conveyer shown in Figs. 4 and 5.

The screw conveyer element forming the subject of the present invention, comprises in general a central driving shaft ordinarily formed of a piece of gas pipe 4, a series of end coacting tubular members 3, 30 surrounding and secured to the pipe 4, and a series of reversely positioned flight sections or blades 2 associated one with each of the tubular members 3, 30 and forming a substantially continuous helical flight extending along the pipe 4. This conveyer element forms the rotor of the screw conveyer and is normally located within a stationary trough or conduit the walls of which are located adjacent to the periphery of the helical flight formed by the blades 2. As this element is caused to revolve within the conduit or trough, material admitted to the path of the helical flight, will be transported or urged from end to end of the conveyer, the direction of such transportation depending upon the setting of the blades 2 and upon the direction of rotation of the transporting flight.

In the form of conveyer disclosed in Figs. 1, 2 and 3, the tubular members 3 have their ends formed perpendicular to the axes of the members and are each provided with a pair of diametrically opposite end projections 15 adapted to engage similarly formed recesses 18 in the ends of the adjacent members 3, in order to properly relatively position the successive tubular members 3. Each of the members 3 is formed of a substantially rectangular sheet metal blank which after being properly punched and distorted, is rolled into tubular form and has its abutting ends connected by means of spot welds at the overlapping projections which are provided for such connection. Each tubular member 3 is also provided with a distorted portion forming a hollow boss 11 within which is located a nut 12. The members 3 after being properly positioned upon the pipe 4 are locked in position by means of set screws 13 co-operating with the nuts 12 in the bosses 11. The successive members 3 are identical in structure and are interchangeable.

The tubular members 3 are each provided with diametrically opposite alined slots 8 which lie in a common plane extending at an acute angle relatively to the axis of the tubular member. The members 3 are further provided with diametrically opposite sets of parallel ears 9 located on opposite sides of the slots 8 and formed by punching out and distorting the metal of the tubular members 3 at the openings 16. These projections 9 have their outer extremities bent toward the intervening slots 8. The slots 8 and projections 9 form oppositely facing definitely spaced abutments for positioning the blades 2. The blades 2 are formed of sheet metal with dies, being of substantially semi-circular formation and having their inner portions cut away to form a projection 5 adapted to fit within the slots 8. The sheet metal blades 2 are interchangeably associable with the diametrically opposite slots 8 and with the complementary ears 9. The ears 9 are provided with alined openings 10 while the blades 2 are provided with openings 6, which openings 10, 6 are all in alinement when a blade has been properly positioned with its projection 5 within a slot 8. With a blade 2 thus positioned a clamping screw 7 may be passed through the alined openings 10, 6, and a nut associated with the screw 7 in order to draw the ears 9 inwardly into firm engagement with the sides of the blade 2 to lock the blade in position. The successive sections of the conveyer are of identical structure but are angularly advanced 180° relatively to each other about the axis of the pipe 4. With the blades 2 positioned as shown in the drawing, rotation of the conveyer in a given direction will advance the material in a predetermined direction longitudinally of the pipe 4. With the blades positioned in the slots 8 in the opposite sides of the tubular members 3, rotation of the conveyer in the same direction will urge the material in the opposite direction longitudinally of the pipe 4.

In the form of conveyer disclosed in Figs. 4, 5 and 6, the tubular members 30 have their ends formed at oblique angles relatively to the axis of the members, and are each provided with diametrically opposite end projections 19 extending outwardly and substantially parallel to the ends of the members 30. These projections 19 may have their outer ends bent toward each other as in the case of the projections 9. Corresponding ends of the tubular members 30 are provided with projections 22 and recesses 20, while the opposite corresponding ends are formed as plane surfaces. With the tubular members 30 properly positioned upon a pipe 4, the plane end of one member 30 coacts with the projections 22 of an adjacent member thus forming diametrically opposite slots at the recesses 20. The projections 19 formed on the adjacent members 30 are located on opposite sides of the slots thus formed, being spaced laterally a slight distance from the slots. The diametrically opposite complementary slots formed by the recesses 20 are alined and lie in a common plane extending at an acute angle relatively to the axis of the tubular members. The slots formed by the recesses 20 and the adjacent end of the next member 30, form oppositely facing definitely spaced abutments for positioning the blades 2.

The blades 2 are formed similar to those disclosed in Figs. 1, 2 and 3, being likewise provided with projections 5 adapted to fit within the slots formed by the recesses 20. With the blades 2 properly positioned relatively to the tubular members 30 and the recesses 20, they may be firmly locked in position by the aid of clamping screws 7 and nuts 17 co-operating with the alined openings, in the ears 19 and the blades 2.

Each of the members 30 is formed of a sheet metal blank which after being properly punched and distorted is rolled into tubular form and has its abutting ends connected by means of spot welds at the overlapping projections 14 which are provided for such connection. As shown, each tubular member 30 is also provided with a distorted portion forming a hollow boss 11 within which is located a nut 12. The members 30 after being properly positioned upon the pipe 4 are locked in position by means of set screws 13 co-operating with the nuts 12 in the bosses 11. It is apparent that with the ends of the tubular members formed at an acute angle, special locking means such as the nuts 12 and set screws 13, are unnecessary and may be omitted if desired. The successive members 30 are identical in structure and are therefore interchangeable.

It will be noted that in the form of conveyer disclosed in Figs. 4, 5 and 6, the successive sections of the conveyer are again angularly advanced 180° relatively to each other about the axis of the pipe 4. With the blades 2 positioned as shown in the drawing, rotation of the conveyer in a given direction will advance the material in a predetermined direction longitudinally of the pipe 4. With the blades positioned in the recesses 20 at the opposite sides of the tubular members 30 rotation of the conveyer in the same direction will urge the material in the opposite direction longitudinally of the pipe 4.

It will be noted that in the assembled structure the series of successive end coacting tubular members 3, 30 form a substantially continuous tube having local diametrically opposite slots which lie in a common plane, although these slots lie in a common plane and are alined, only one of each set of diametrically opposite slots is engageable with a blade 2 at a time. It will also be obvious that it is not necessary to form the tube in sections nor is it necessary to provide a pipe 4 for supporting the tubes. The successive tubular members 3, 30 may be formed as one continuous tube thus eliminating necessity of providing a supporting pipe 4.

It will be obvious that the flight sections and the blades may be readily constructed of sheet metal with the aid of dies. The blades are easily removed due to the location of the locking means on the same side of the central drive element as the blade. In the commercial manufacture of these conveyers, due to the relatively small pieces of stock necessary to form blades 2 and the tubular members 3, 30, it is found that scrap material may be utilized, thereby making the cost of raw material necessary for the production of the sections, practically nil.

It should be understood that it is not desired to limit the invention to the exact details of construction herein shown and described, for various modifications within the scope of the appended claims may occur to persons skilled in the art.

It is claimed and desired to secure by Letters Patent:

1. In combination, a tube having an elongated recess extending transversely thereof and an ear located laterally adjacent to said recess, a blade having a single central inwardly extending projection engageable with said recess to positively prevent displacement of said blade around and along said tube, and means connecting said ear and said blade to prevent displacement of said blade away from said tube.

2. In combination, a sheet metal tube having an elongated recess extending transversely thereof and an ear formed integral with said tube and located laterally adjacent to said recess, a sheet metal blade having a single central inwardly extending projection engageable with said recess to positively prevent displacement of said blade around and along said tube, and means connecting said ear and said blade to prevent displacement of said blade away from said tube.

3. In combination, a tube having an elongated recess extending transversely thereof and an ear located laterally adjacent to the medial portion of said recess, a plane blade having a single central inwardly extending projection lying in the plane of said blade and engageable with said recess to positively prevent displacement of said blade around and along said tube, and means connecting said ear and said blade to prevent displacement of said blade away from said tube.

4. In combination, a sheet metal tube having an elongated recess extending transversely thereof and an ear formed integral with said tube and located laterally adjacent to the medial portion of said recess, a sheet metal plane blade having a single central inwardly extending projection lying in the plane of the blade and engageable with said recess to positively prevent displacement of said blade around and along said tube, and means passing through said ear and said blade longitudinally of said tube to prevent displacement of said blade away from said tube.

5. In combination, a tube having a pair of diametrically opposite elongated recesses lying in a common plane and extending transversely of the tube, said tube having an ear located laterally adjacent to each of said recesses, a blade having a single central inwardly extending projection, interchangeably engageable with said recesses to positively prevent displacement of said blade around and along said tube, and means cooperable with either of said ears and with said blade to prevent displacement of said blade away from said tube when positioned in a complementary recess.

6. In combination, a sheet metal tube having a pair of diametrically opposite elongated recesses extending transversely of said tube and lying in a common plane, said tube having an ear located laterally adjacent to the medial portion of each of said recesses, a sheet metal plane blade having a single central inwardly extending projection lying in the plane of the blade and interchangeably engageable with said recesses to positively prevent displacement of said blade around and along said tube, and means interchangeably cooperable with said ears and with said blade to prevent displacement of said blade away from said tube and from a complementary recess.

In testimony whereof, the signature of the inventor is affixed hereto.

WILLIAM H. LIEBER.